US009787980B2

United States Patent
Girdzijauskas et al.

(10) Patent No.: US 9,787,980 B2
(45) Date of Patent: Oct. 10, 2017

(54) AUXILIARY INFORMATION MAP UPSAMPLING

(75) Inventors: Ivana Girdzijauskas, Solna (SE); Per Fröjdh, Stockholm (SE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 14/238,485

(22) PCT Filed: Jun. 29, 2012

(86) PCT No.: PCT/SE2012/050746
§ 371 (c)(1),
(2), (4) Date: Feb. 12, 2014

(87) PCT Pub. No.: WO2013/025157
PCT Pub. Date: Feb. 21, 2013

(65) Prior Publication Data
US 2014/0205023 A1   Jul. 24, 2014

Related U.S. Application Data

(60) Provisional application No. 61/524,433, filed on Aug. 17, 2011.

(51) Int. Cl.
*H04N 19/46* (2014.01)
*H04N 19/597* (2014.01)
(Continued)

(52) U.S. Cl.
CPC ... *H04N 19/00545* (2013.01); *H04N 13/0018* (2013.01); *H04N 13/0022* (2013.01);
(Continued)

(58) Field of Classification Search
CPC ......... H04N 13/0271; H04N 19/00545; H04N 19/46; H04N 19/51; H04N 19/597; H04N 13/0018; H04N 13/0022; H04N 2213/003
(Continued)

(56) References Cited

U.S. PATENT DOCUMENTS

2009/0041121 A1* 2/2009 Chen .................... H04N 19/105
375/240.12
2010/0141651 A1   6/2010 Tan
(Continued)

FOREIGN PATENT DOCUMENTS

EP         0735512 A2    10/1996
WO      2010013171 A1     2/2010
(Continued)

OTHER PUBLICATIONS

Yeo, Donghoon et al., "Adaptive Bilateral Filtering for Noise Removal in Depth Upsampling", IEEE ISOCC Design Conference, 2010, 36-39.
(Continued)

*Primary Examiner* — William C Vaughn, Jr.
*Assistant Examiner* — Jae N Noh
(74) *Attorney, Agent, or Firm* — Murphy, Bilak & Homiller, PLLC

(57) ABSTRACT

An auxiliary information map (10) is upsampled to form an upsampled auxiliary information map (20). Multiple reference pixels (23) in the upsampled auxiliary information map (20) are selected for a current pixel (21) in the upsampled auxiliary information map (20) based on texel values of texels in an associated texture (30). An updated pixel value is calculated for the current pixel (21) based on the pixel values of the selected reference pixels (23).

23 Claims, 7 Drawing Sheets

(51) Int. Cl.
*H04N 13/00* (2006.01)
*H04N 19/51* (2014.01)

(52) U.S. Cl.
CPC .............. *H04N 19/46* (2014.11); *H04N 19/51* (2014.11); *H04N 19/597* (2014.11); *H04N 2213/003* (2013.01)

(58) Field of Classification Search
USPC .................................................... 375/240.27
See application file for complete search history.

(56) References Cited

U.S. PATENT DOCUMENTS

| | | | |
|---|---|---|---|
| 2011/0043526 | A1* | 2/2011 | Shiomi ................ G06T 3/40 345/428 |
| 2012/0008857 | A1* | 1/2012 | Choi ................ G06T 7/0022 382/154 |
| 2012/0141016 | A1* | 6/2012 | Wildeboer ......... H04N 13/0271 382/154 |
| 2013/0009952 | A1* | 1/2013 | Tam ................ G06T 7/0067 345/419 |

FOREIGN PATENT DOCUMENTS

| | | |
|---|---|---|
| WO | 2011046607 A2 | 4/2011 |
| WO | 2010087751 A1 | 8/2012 |
| WO | 2013006115 A2 | 1/2013 |

OTHER PUBLICATIONS

Chan, Derek et al., "A Noise-Aware Filter for Real-Time Depth Upsampling." Workshop on Multi-camera and Multi-modal Sensor Fusion Algorithms and Applications—M2SFA2. Marseille, France. Oct. 2008. 1-12.

Diebel, James, "An Application of Markov Random Fields to Range Sensing." Proceedings of Conference on Neural Information Processing Systems. Cambridge, MA. 2005. 1-8.

Garcia, Frederic et al., "Pixel Weighted Average Strategy for Depth Sensor Data Fusion," Proceedings of 2010 IEEE 17th International Conference on Image Processing. Hong Kong. Sep. 26-29, 2010. 1-4.

Guttmann, Moshe et al., "Semi-automatic Stereo Extraction from Video Footage." 2009 IEEE 12th International Conference on Computer Vision. Kyoto. Sep. 29, 2009-Oct. 2, 2009. 1-8.

Kopf, et al., "Joint Bilateral Upsampling," ACM Transactions on Graphics, vol. 26, No. 3, Article 96. Jul. 2007. 1-6.

Portugal, et al., "A Comparison of Block Pivoting and Interior-Point Algorithms for Linear Least Squares Problems with Nonnegative Variables." Mathematics of Computation. American Mathematical Society. vol. 63, No. 208. Oct. 1994. 625-643.

Unknown, Author, "Applications and Requirements on 3D Video Coding." International Organisation for Standardisation. Coding of Moving Pictures and Audio. JTC1/SC29/WG11. MPEG2011/N12035. Geneva, Switzerland. Mar. 2011. 1-7.

Bleyer et al. "Graph-based Surface Reconstruction from Stereo Pairs Using Image Segmentation." SPIE vol. 5665. pp. 288-299. Jan. 2005.

Boykov et al. "An Experimental Comparison of Min-Cut/Max-Flow Algorithms for Energy Minimization in Vision." IEEE Transactions on PAMI, vol. 26, No. 9, pp. 1124-1137, Sep. 2004.

Felzenszwalb et al. "Efficient Belief Propagation for Early Vision." IEEE Transactions on Pattern Analysis and Machine Intelligence. vol. 26, No. 9. pp. 1124-1137. Sep. 2004.

Hong et al. "Segment-based Stereo Matching Using Graph Cuts." CVPR, pp. 74-81. 2004.

Hu et al. "Depth Map Super-Resolution Using Synthesized View Matching for Depth-Image-Based Rendering." 2012 IEEE International Conference on Multimedia and Expo Workshops. pp. 605-610.

Velisavljevic. "Bit Allocation for Multiview Image Compression Using Cubic Synthesized View Distortion Model." IEEE 2011. 1-6.

Ziou et al. "Edge Detection Techniques—An Overview." International Journal of Pattern Recognition and Image Analysis, vol. 8(4), pp. 537-559, 1998.

Zitnick et al. "High-quality Video View Interpolation Using a Layered Representation." ACM SIGGRAPH, vol. 23(3), pp. 600-608. Aug. 2004.

\* cited by examiner (A)  (B)  (C)

(A) (B)

AUXILIARY INFORMATION MAP UPSAMPLING

TECHNICAL FIELD

The embodiments generally relate to upsampling of data, and in particular to upsampling of an auxiliary information map that is associated with a texture.

BACKGROUND

The research in three-dimensional (3D) media has gained a lot of momentum in recent years, and there is a lot of interest from industry, academy and consumer society. A number of 3D movies are being produced every year, providing great stereoscopic effects to the spectators. However, this is only a part of the story. Namely, we can already enjoy the 3D experience at home, and in the very near future, we will have 3D-enabled mobile phones as well.

The term 3D is usually connected to stereoscopic experience, where user's eyes are provided with slightly different images of a scene which are further fused by the brain to create a depth impression. However, there is much more to 3D. Free viewpoint television (FTV) is a novel audio-visual system that allows users to have a 3D visual experience while freely changing their position in front of a 3D display. Unlike the typical stereoscopic television, which enables a 3D experience to users that are sitting at a fixed position in front of a screen, FTV allows to observe the scene from many different angles, thus providing a more realistic impression.

The FTV functionality is enabled by multiple components. The 3D scene is captured by many cameras and from different views or angles so-called multiview video. Different camera arrangements are possible, depending on the application. For example, it may be as simple as a parallel camera arrangement on a one-dimensional (1D) line, whereas in more complex scenarios it may include two-dimensional (2D) camera arrays forming an arc structure.

Multiview video can be relatively efficiently encoded by exploiting both temporal and spatial similarities that exist in different views. The first version of multiview video coding (MVC) was standardized in Jul. 30, 2008. However, even with MVC, the transmission cost remains prohibitively high. This is why only a subset of the captured multiple views is actually being transmitted, in combination with additional 3D components.

In order to compensate for the missing information, depth and disparity maps can be used instead. Depth map is a simple grayscale image, wherein each pixel indicates the distance between the corresponding pixel from a video object and the capturing camera. Disparity, on the other hand, is the apparent shift of a pixel which is a consequence of moving from one viewpoint to another. Depth and disparity are mathematically related and can be interchangeably used.

From the multiview video and depth/disparity information we can generate virtual views at an arbitrary viewing position as depicted in FIG. 1. In this way we compensate for the unsent multiview video, but we can also synthesize additional virtual views.

Having good quality depth maps is of crucial importance. Namely, errors in a depth map translate to incorrect shifts of texture pixels in a synthesized view. This is especially visible around object boundaries, where we can see pixels from foreground objects being incorrectly copied to the background, and vice versa. This results in an annoying viewing experience.

Depth maps are usually estimated, and there is a wealth of algorithms available for that purpose in the art. However, the quality of depth maps estimated this way may be far from acceptable. There are some reasons for this. Firstly, pixels in occluded regions, i.e. regions visible in one of the images but not in the other one(s), cannot be correctly estimated. Secondly, images used for depth estimation are always affected by some level of sensor noise, which affects the accuracy of depth maps. Finally, brightness constraints imposed on images used in depth estimation algorithms are difficult to meet in practice.

Alternatively, depth maps can be obtained by specialized cameras, e.g. infrared or time-of-flight (ToF) cameras. This typically gives high quality accurate depth maps. However, ToF cameras are still commercially ill-deployed due to their high cost and incapability to provide competitive resolutions compared to video cameras.

Depth maps may be transmitted with a reduced resolution. Being simpler than the regular video signals, they can be downsampled without too much loss of information. Thus, not only the bitrate is reduced but also a constraint by the display manufacturers is met. This motivates the search for new effective depth upsampling concepts.

Standard image or video upsampling methods such as nearest neighbor, linear, bilinear or bicubic interpolation provide only limited quality results when applied on depth maps. Unlike their common use, where they are applied on textures directly, these filters may introduce incorrect distance information for the pixels. This further causes incorrect shifts of texture pixels in a synthesized view. FIG. 2 illustrates this "smearing" effect, visible all around the foreground object boundaries, where the pixels from the clothes and heads are copied in the background. This may result in a very annoying experience. Thus, the prior art depth and disparity map upsampling methods have significant limitations and can produce undesired smearing effect.

Different solutions have been proposed, like the use of Markov Random Fields (MRF) or joint-bilateral upsampling (JBU). Especially JBU has gained a lot of interest and lead to several extensions, such as a noise-aware filter for depth upsampling (NAFDU), switching between bilateral and joint-bilateral filtering depending on a pre-filtered depth map. However, the use of JBU leads to problems such as texture copying, as depicted in FIG. 3. Moreover, the performance of JBU is parameter dependent. Because of complexity reasons, the parameters are usually chosen on the frame or sequence level. This is clearly suboptimal, since even a single frame may contain both very smooth regions and regions with lots of edges, both requiring different set of parameters.

Thus, there is a need for an efficient upsampling that can be applied to at least depth and/or disparity maps.

SUMMARY

It is a general objective to provide an efficient upsampling of auxiliary information maps.

This and other objectives are met by embodiments as disclosed herein.

An aspect of the embodiments defines a method of upsampling an auxiliary information map comprising multiple, i.e. at least two, pixels having a respective pixel value. The auxiliary information map is further associated with a texture comprising multiple texels having respective texel values. The method comprises upsampling the auxiliary information map to form an upsampled auxiliary information map comprising multiple pixels. The upsampling is performed based on the pixel values of the auxiliary information map. At least one of the pixels in the upsampled auxiliary information map is then further processed by selecting multiple reference pixels in the upsampled auxiliary information map for the at least one pixel. These multiple reference pixels are selected based on the texel values of a portion of the texels in the texture. An updated pixel value is then calculated for the at least one pixel based on the pixel values of the selected reference pixels.

Another aspect of the embodiments defines a device for upsampling an auxiliary information map having an associated texture. The device comprises an upsampler configured to upsample the auxiliary information map based on the pixel values in the auxiliary information map to form an upsampled auxiliary information map. A pixel selector is configured to select multiple reference pixels in the upsampled auxiliary information map for at least one pixel in the upsampled auxiliary information map. This reference pixel selection is performed by the pixel selector based on texel values of a portion of the texels in the associated texture. A value calculator calculates an updated pixel value for the at least one pixel based on the pixel values of the reference pixels selected by the pixel selector.

A further aspect of the embodiments defines a computer program for upsampling an auxiliary information map being associated with a texture. The computer program comprises code means which when run on a computer causes the computer to upsample the auxiliary information map based on its pixel values to form an upsampled auxiliary information map. The computer is further caused to select multiple reference pixels in the upsampled auxiliary information map for at least one of the pixels in the upsampled auxiliary information map based on texels values in a portion of the associated texture. The computer is also caused to calculate an updated pixel value for the at least one pixel based on the pixel values of the selected reference pixels.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present embodiments generally relate to upsampling or upscaling of pixel maps, denoted auxiliary information maps herein, and in particular to upsampling of such auxiliary information maps that is performed at least partly based on additional information obtained from a texture, image or video frame associated with the auxiliary information map.

Thus, the auxiliary information map can be seen as a map where each pixel of the map carries auxiliary or additional information related to an associated texture, image or video frame, which in turn typically carries video, image or media data.

A particular example of such an auxiliary information map according to the embodiments is a depth map, also denoted Z-map, depth buffer or Z-buffer in the art. Each pixel in the depth map is then associated with a respective depth value as pixel value. The depth value indicates the distance between the pixel from a video object, or expressed differently indicates the distance to the surface of a scene object from a viewpoint, which typically is a camera.

Another particular example of an auxiliary information map comprising multiple pixels having a respective pixel value of the embodiments is a disparity map. A disparity map comprises multiple pixels each having a respective disparity value as pixel value. The disparity value represents the apparent shift of a pixel which is a consequence of moving from one viewpoint (camera) to another viewpoint (camera). Of particular importance is binocular disparity which refers to the difference in image location of a scene object seen by a left camera and a right camera resulting from a spatial separation of the two cameras.

Disparity and depth are mathematically related and can be interchangeably used. Generally, the mathematical relationship between disparity (d) and depth (Z) can be expressed as $$Z = \frac{bf}{d},$$

wherein b denotes the baseline distance between viewpoints or cameras and f is the focal length.

Depth and disparity maps can together be regarded as depth or distance representing or depending maps, where each pixel has a respective depth/distance representing or dependant value.

A further example of an auxiliary information map according to the embodiments is a so-called disocclusion map where each pixel of the disocclusion map has a respective disocclusion value. Such a disocclusion map defines which pixels are visible in one view but not in another view. Thus, the disocclusion information defines what is revealed in the scene when moving from one viewpoint to another viewpoint.

The embodiments are advantageously applied to the above identified examples of auxiliary information maps. However, the embodiments are not limited thereto and can be used in connection with other examples of pixels maps that carry auxiliary and additional information related to an associated texture, image or video frame.

Figure 8:
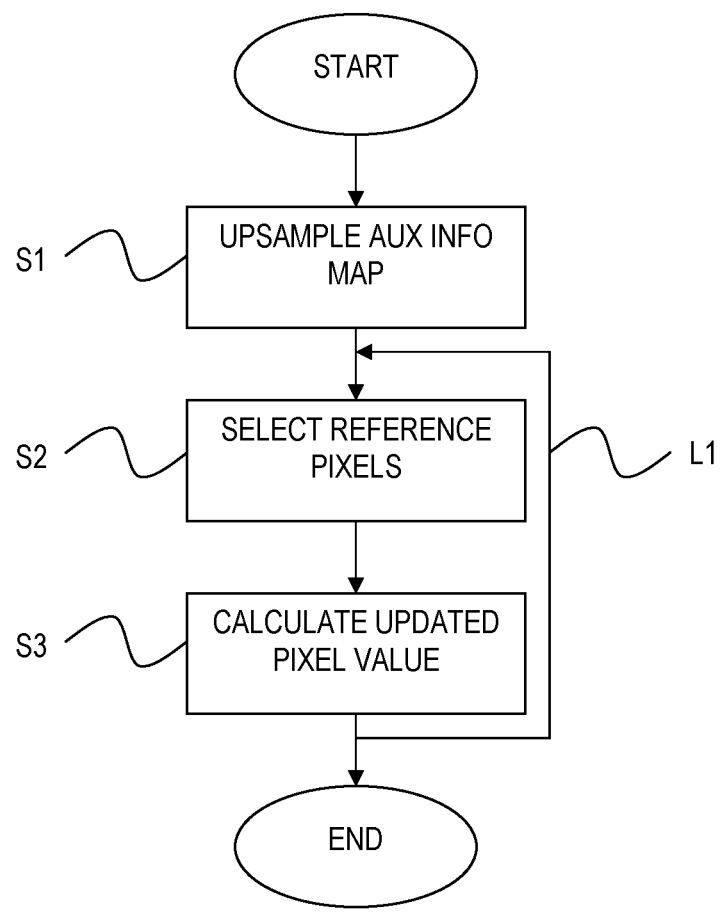
FIG. 8 is a flow diagram illustrating a method of upsampling an auxiliary information map according to an embodiment.

FIG. 8 is a flow diagram illustrating a method of upsampling an auxiliary information map according to an embodiment. The auxiliary information map comprises, as stated in the foregoing, multiple pixels each having a respective pixel value. In addition, the auxiliary information map is associated with a texture, image or video frame comprising multiple pixels or texture elements, denoted texels in the art, each having a respective pixel or texel value. Such a texel value can for instance be a color value. In the art, different color formats are used including red, green, blue (RGB) or luminance and chrominance, such as YUV, YCbCr. In such a case, a texel value could be a RGB triplet, a YUV triplet, a YCbCr triplet or a R, G or B value, a luminance value or a chrominance value.

The auxiliary information map is associated with and related to the texture in terms of carrying auxiliary information in its pixels that relates to and applies to the corresponding texels in the texture. Thus, while a texel carry a texture value in the form of, for example, a color value for that texel position, the auxiliary information map can carry, for instance, depth information that relates to the particular texel position. The auxiliary information map can be estimated or be measured directly. For instance, depth or disparity maps can, for instance, be estimated according to any of the algorithms disclosed in documents [1-5] or be obtained directly by specialized cameras as disclosed in document [2].

According to the embodiments, the auxiliary information map is provided in a downsampled version or could indeed be estimated and generated at a resolution that is lower than the resolution of the texture. Hence, when processing the auxiliary information map, such as co-processing the auxiliary information map and the texture, for instance, when synthesizing virtual views from neighbouring views and depth/disparity maps, the auxiliary information map is typically upsampled prior to or during the processing.

Figure 1:
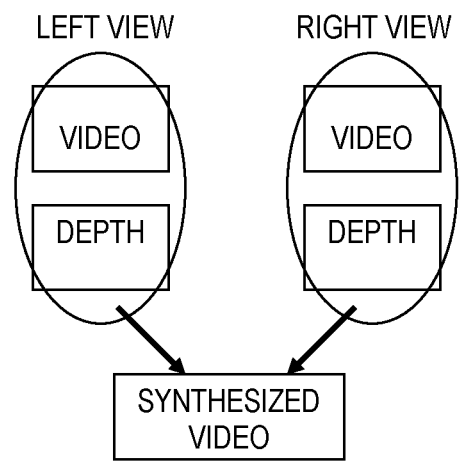
FIG. 1 schematically illustrates how virtual views can be synthesized from neighboring views and depth or disparity maps.
Figure 2:
FIG. 2 illustrates common artifacts in synthesized views that is due to prior art depth map upsampling schemes here represented by linear interpolation.
Figure 3:
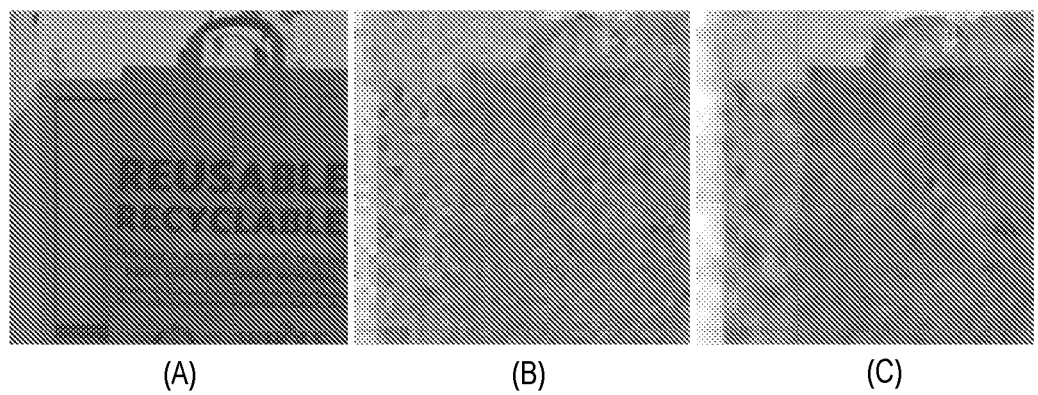
FIGS. 3A-3C illustrate a high resolution color image (FIG. 3A) and a low resolution depth map (FIG. 3B), which is upsampled using conventional JBU (FIG. 3C). The JBU-based depth map upsampling causes undesired copying of the intensity texture into the geometry.
Figure 4:
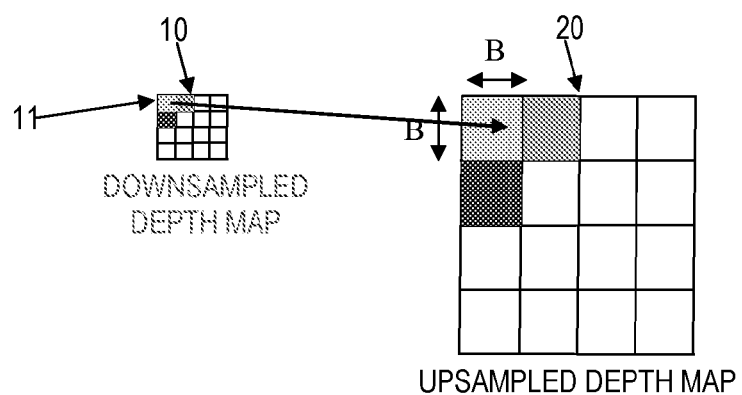
FIG. 4 schematically illustrated an example of upsampling of a depth map.

Thus, step S1 of the method in FIG. 8 upsamples the auxiliary information map to form an upsampled auxiliary information map comprising multiple pixels. FIG. 4 schematically illustrates this process where the auxiliary information map is represented by a depth map. Thus, a downsampled or initial depth map 10 comprising multiple pixels 11 is upsampled in step S1 to get an upsampled depth map 20 comprising multiple pixels and having a resolution in terms of number of pixels that is larger or higher than the resolution of the downsampled depth map 10.

The upsampling in step S1 is performed based on the pixel values of the multiple pixels in the auxiliary information map. There is a wealth of algorithms that can be used to upsample the auxiliary information map. For instance, a simple way to do the upsampling is by nearest neighbour interpolation, where the pixels from the low resolution auxiliary information map are simply copied to the upsampled auxiliary information map. This is schematically illustrated in FIG. 4, where the resolution of the upsampled depth map 20 is B×B times higher as compared to the downsampled depth map 10. Other ways of performing the upsampling include bilinear interpolation, bicubic interpolation and splines. These approaches vary in complexity and performance. Generally, bilinear interpolation offers a good compromise between complexity and performance. The above mentioned upsampling algorithms should, however, merely be seen as illustrative examples and the embodiments are not limited thereto.

The next two steps S2 and S3 of the method in FIG. 8 are performed for at least one pixel in the upsampled auxiliary information map.

Step S2 selects multiple reference pixels in the upsampled auxiliary information map for the current pixel. These multiple reference pixels are to be used in step S3 when modifying or updating the pixel value for the current pixel. The multiple reference pixels are selected in step S2 based on texel values of a portion of the texels in the texture. Thus, texels in the associated texture are used as reference in order to identify and select which pixels in the upsampled auxiliary information map that should be used as reference pixels for the current pixel.

A next step S3 calculates an updated pixel value for the current pixel based on the pixel values of the multiple reference pixels selected in step S2. Various embodiments are possible to calculate the updated pixel value. For instance, the updated pixel value could be the median value of the pixels values of the selected reference pixels. If the number of selected reference pixels is even, selecting a median value might introduce new pixel values by taking the average of the two midmost pixel values of the selected reference pixels. In a particular approach, then one of these two midmost pixel values is selected as updated pixel value instead of the median value. A further variant is to calculate the updated pixel value for the current pixel to be based on or equal to the average value of the pixel values of the selected reference pixels.

Steps S2 and S3 are then preferably repeated for other pixels in the upsampled auxiliary information map. In a particular embodiment, steps S2 to S3 are performed for each pixel in the upsampled auxiliary information map, which is schematically illustrated by the line L1. In other embodiments, only a portion of the upsampled auxiliary information map is needed in the processing. In such a case, only those pixels in that portion of the upsampled auxiliary information map need to be processed as defined by steps S2 and S3.

The method then ends with an updated or refined upsampled auxiliary information map. This updated upsampled auxiliary information map can then be further processed, such as used together with the associated texture when synthesizing new or virtual views for multiview video.

The relevant portion of texels in the texture that is used to select the reference pixels in step S2 is preferably identified based on the position of the current pixel in the upsampled auxiliary information map. Thus, the pixel position or coordinate of the current pixel in the upsampled auxiliary information is employed to identify those texels in the associated texture that are to be used when selecting the reference pixels for the current pixel. Generally, the texel position in the texture that corresponds to or matches the pixel position of the current pixel in the upsampled auxiliary information map is first identified. Thereafter the portion of texels is identified in the texture relative to this texel position.

In a particular embodiment multiple segments are identified or defined in the texture based on the texel values of the texels. Each such segment then comprises at least one but typically multiple texels of the texels in the texture. FIG.

5A schematically illustrates such a situation with a texture 30 comprising two segments 40, 41 separated by a border or edge 42. A segment 40, 41 is generally defined as a region or object of the texture 30 that is at least fairly homogenous, i.e. the difference between texel values of the texels in the segment 40, 41 is typically not larger than a defined maximum threshold.

There are several available segmentation algorithms that can be used to define the different segments in the texture. Examples include means-shift image segmentation, pyramid image segmentation, k-means clustering. Alternatively, a simple thresholding as mentioned above can be used to divide an image or texture into different regions. Furthermore, various edge detection algorithms can be used to indicate where the borders or boundaries between segments are in the texture. An example of such an edge detection algorithm is disclosed in document [6]. The embodiments are, though, not limited to the above listed segment/edge detecting algorithms and can use other such algorithms known in the art.

Figure 5:
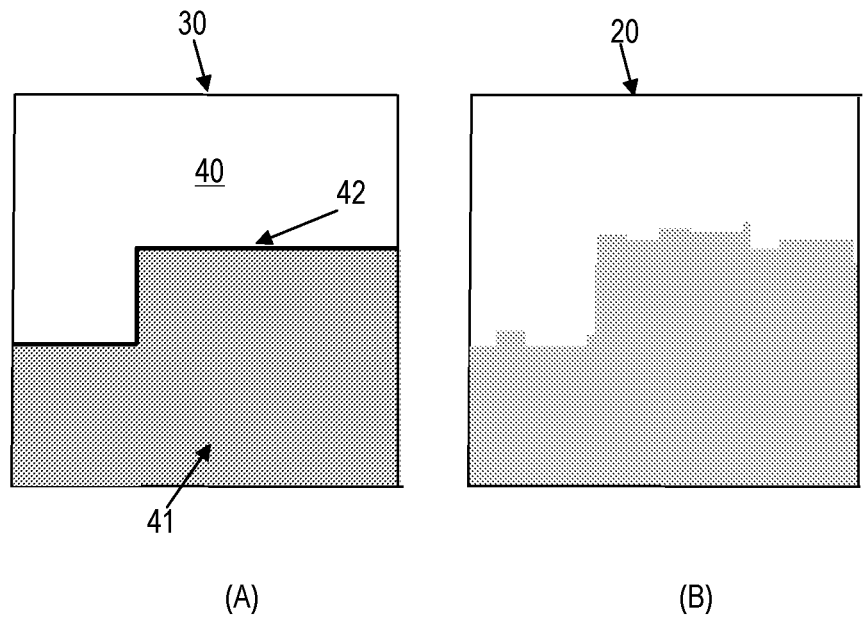
FIGS. 5A and 5B illustrate a texture consisting of two segments (FIG. 5A) and an associated upsampled depth map (FIG. 5B).

FIG. 5B illustrates the associated upsampled auxiliary information map, represented by an upsampled depth map 20 in the figure. As can be seen, the upsampled depth map 20 might not be perfectly aligned with the associated texture 30 in terms of pixel values versus texel values. This can happen because of imperfections of the original depth map, which might have been obtained from an estimation process. Other causes include loss of information due to downsampling of the original depth map to form the downsampled depth map, introduction of coding artifacts, such as block artifacts at low bitrates, or because of the upsampling performed in step S1 of FIG. 8.

In a particular embodiment the selecting step S2 of FIG. 8 comprises the following sub-steps of determining to which segment of the multiple segments a texel position in the texture belongs to. This relevant texel position corresponds to the position of the current pixel in the upsampled auxiliary information map. Thus, given the position of the current pixel in the upsampled auxiliary information map, the matching texel position in the associated texture is identified. Then the segment to which this texel position belongs to is identified.

Figure 6:
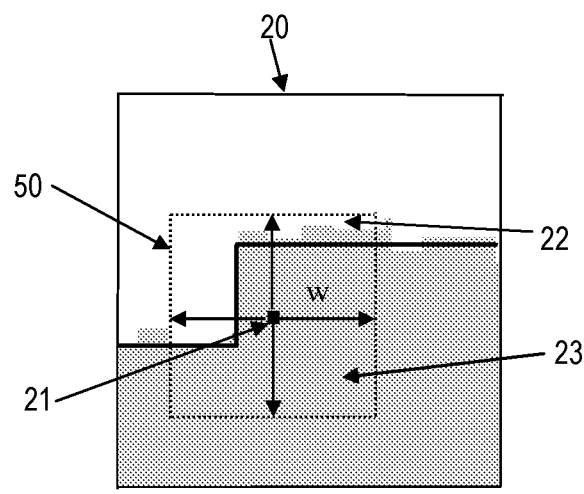
FIG. 6 illustrates an upsampled depth map with an indicated search space of neighboring reference pixels.

A next sub-step defines a search space encompassing a set of reference pixels relative to the current pixel in the upsampled auxiliary information map. FIG. 6 illustrates such a search space 50 of reference pixels 22, 23, of which only two are marked with reference signs, relative to the position of the current pixel 21 in the upsampled auxiliary information map 20.

The search space 50 can be any defined space relative to the position of the current pixel 21. However, the search space 50 is advantageously centered at the current pixel position and thereby encompasses neighboring or adjacent pixels 22, 23 in the upsampled auxiliary information map 20. The search space 50 could be a quadratic search space as illustrated in FIG. 6, a rectangular search space, a circular search space or generally have any defined shape. In FIG. 6, the search space 50 defines a set of $(2W+1) \times (2W+1)$ reference pixels 22, 23 centered in the upsampled auxiliary information map 20 at the position of the current pixel 21. In such a case, the parameter W is a positive integer equal to or larger than one. The parameter W is preferably also smaller than $(N+1)/2$, where N denotes the total number of pixels in a pixel row or a pixel column in the upsampled auxiliary information map 20. If the total number of pixels in a pixel row ($N_R$) differs from the total number of pixels in a pixel column ($N_C$) then the parameter W is preferably smaller than both $(N_R+1)/2$ and $(N_C+1)/2$. Thus, in a particular embodiment, the search space 50 encompasses a subset or portion of the pixels in upsampled auxiliary information map 20.

The size and shape of the search space could be fixed and the same for all pixel positions. It is though anticipated that for some pixel positions, in particular at or close to the edge of the upsampled auxiliary information map the search space will extend beyond the outer borders of the upsampled auxiliary information map. In such a case, only those pixels that are enclosed by the search space are employed.

It is further possible to update the size and/or the shape of the search space depending on the particular position of the current pixel within the upsampled auxiliary information map.

As is seen from FIG. 6, when defining the search space 50 it can encompass pixels 23 that belong to the same segment as the current pixel 21 but also encompass pixels 22 that belong to another segment 22. If all pixels 22, 23 within the search space 50 would have been used when updating the pixel value for the current pixel 21, then an inappropriate pixel value could be obtained through the inclusion of pixel values that actually belong to another segment.

Figure 7:
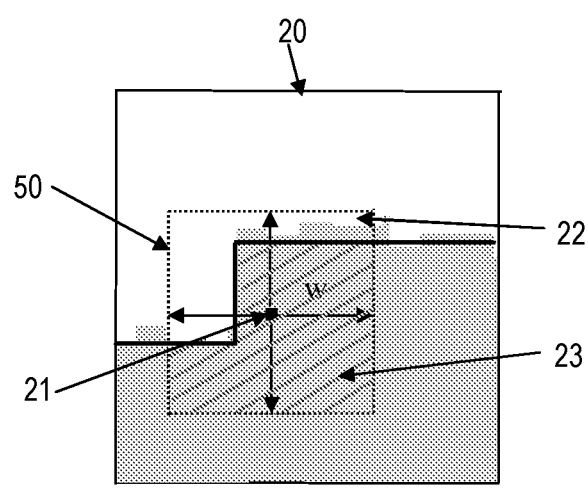
FIG. 7 illustrates an upsampled depth map with an indicated search space of neighboring reference pixels after taking information from a texture.

Hence, a further substep preferably identifies the reference pixels of the set of reference pixels that have positions in the upsampled auxiliary information map that correspond to positions in the texture belonging to the previously determined segment, i.e. the segment to which the current pixel belongs to. FIG. 7 schematically illustrates this. The hashed area of the search space 50 of FIG. 7 indicates those reference pixels 23 which belong to the same segment as the current pixel 21 as determined from the associated texture. Thus, in a particular embodiment only these reference pixels 23 should be used when calculating the updated pixel value thereby omitting or ignoring the reference pixels 22 within the search space 50 that belongs to another segment as determined from the associated texture.

In a particular embodiment, the upsampling of the auxiliary information map in step S1 comprises upsampling the auxiliary information map to form the upsampled auxiliary information having a same resolution as the texture. Thus, the resolution of the upsampled auxiliary information map is preferably equal to the resolution of the texture. As used herein "resolution" refers to the size in terms of number of including pixels or texels.

In an optional embodiment, additional smoothing of the updated and upsampled auxiliary information map can be done in order to suppress and combat blurring artifacts. Such a smoothing of the updated pixel values in the upsampled auxiliary information map can be performed by pixel value filtering using, for instance, bilateral filtering.

In a particular embodiment, the auxiliary information map is a depth map comprising multiple pixels having a respective depth value. Step S1 of FIG. 8 then comprises upsampling the depth map based on the depth values of the multiple pixels of the depth map to form an upsampled depth map comprising multiple pixels. Step S2 comprises selecting, for at least one pixel in the upsampled depth map, multiple reference pixels in the upsampled depth map based on the texel values of a portion of multiple texels in the associated texture. Step S3 calculates an updated depth value for the at least one pixel based on the depth values of the selected reference pixels.

In another particular embodiment, the auxiliary information map is a disparity map comprising multiple pixels having a respective disparity value. Step S1 of FIG. 8 then comprises upsampling the disparity map based on the disparity values of the multiple pixels of the disparity map to form an upsampled disparity map comprising multiple pixels. Step S2 comprises selecting, for at least one pixel in the upsampled disparity map, multiple reference pixels in the upsampled disparity map based on the texel values of a portion of multiple texels in the associated texture. Step S3 calculates an updated disparity value for the at least one pixel based on the disparity values of the selected reference pixels.

The present embodiments typically result in smoother and better quality auxiliary information maps. Even more importantly, when using the upsampled auxiliary information map to synthesize virtual views, the quality of such views will consequently be higher.

Furthermore, being able to upsample auxiliary information maps with high accuracy and quality enables usage of reduced bitrate for the (downsampled) auxiliary information map. Alternatively, if the total bitrate is fixed, the embodiments enable increasing the texture bitrate and therefore improve the 3D experience.

Figure 9:
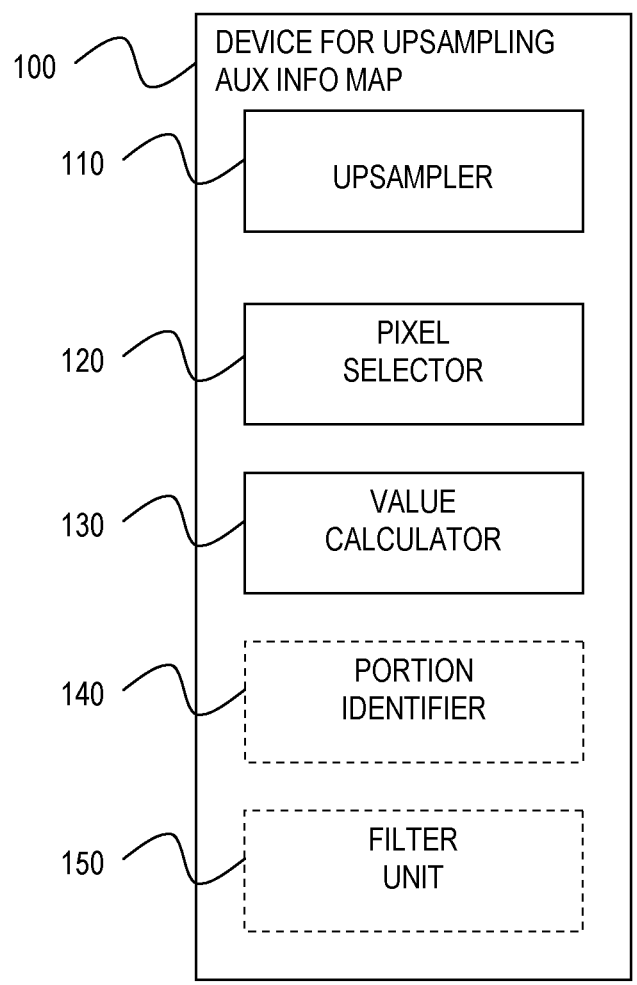
FIG. 9 is a schematic block diagram illustrating a device for upsampling an auxiliary information map according to an embodiment.

FIG. 9 is a schematic block diagram of a device 100 for upsampling an auxiliary information map according to an embodiment. The device 100 comprises an upsampler 110 configured to upsample the auxiliary information map based on the pixel values of the pixels in the auxiliary information map. The result of the upsampling is an upsampled auxiliary information map with multiple pixels. A pixel selector 120 is configured to select multiple reference pixels in the upsampled auxiliary information map for at least one pixel in the upsampled auxiliary information map. The pixel selector 120 performs this pixel selection based on texel values of a portion of multiple texels in an associated texture. A value calculator 130 of the device 100 is configured to calculate an updated pixel value for the at least one pixel based on the pixel values of the multiple reference pixels selected by the pixel selector 120.

The upsampler 110 preferably utilizes one of the previously mentioned upsampling algorithms, such as nearest neighbor interpolation, bilinear interpolation, bicubic interpolation or splines, to form the upsampled auxiliary information map.

The upsampler 110 could upsample the auxiliary information map so that the resolution of the upsampled auxiliary information map will be equal to or substantially equal to the resolution of the associated texture.

The value calculator 130 is advantageously configured to calculate the updated pixel value for the at least one pixel to be one of the median or average of the pixel values of the multiple reference pixels selected by the pixel selector 120.

The device 100 may optionally comprise a portion identifier 140 that is configured to identify the portion of the multiple texels in the texture that are used by the pixel selector 120. The portion identifier 140 then advantageously identifies this texture portion based on the position of the at least one pixel in the upsampled auxiliary information map and preferably based on the corresponding position within the texture.

The device 100 may optionally comprise a filter unit 150 that is configured to smooth the updated pixel values of the updated and upsampled auxiliary information map by pixel value filtering as previously disclosed herein.

The device 100 of FIG. 9 is advantageously configured to upsample an auxiliary information map in the form of a depth map or a disparity map as discussed herein.

The device 100 can be implemented in hardware, in software or a combination of hardware and software. The device 100 can be implemented in a user equipment, such as a mobile telephone, tablet, desktop, netbook, multimedia player, video streaming server, set-top box or computer. The device 100 may also be implemented in a network device in the form of or connected to a network node, such as radio base station, in a communication network or system.

Although the respective unit 110-150 disclosed in conjunction with FIG. 9 have been disclosed as physically separate units 110-150 in the device 100, and all may be special purpose circuits, such as ASICs (Application Specific Integrated Circuits), alternative embodiments of the device 100 are possible where some or all of the units 110-150 are implemented as computer program modules running on a general purpose processor. Such an embodiment is disclosed in FIG. 11.

Figure 11:
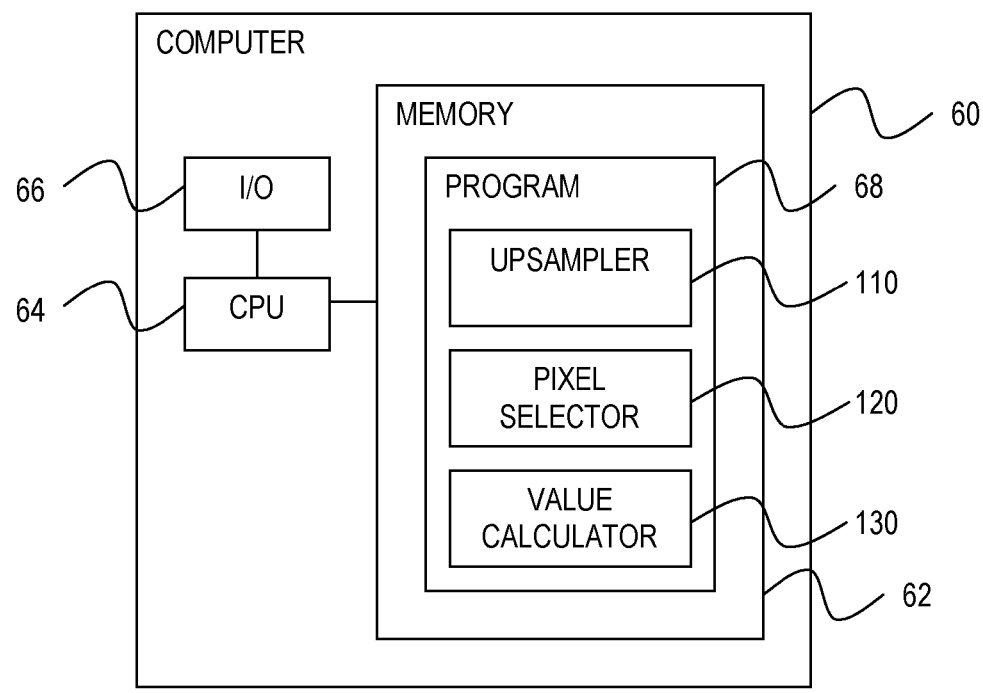
FIG. 11 is a schematic block diagram illustrating a computer comprising a computer program product with a computer program for upsampling an auxiliary information map according to an embodiment.

FIG. 11 schematically illustrates an embodiment of a computer 60 having a processing unit 64, such as a DSP (Digital Signal Processor) or CPU (Central Processing Unit). The processing unit 64 can be a single unit or a plurality of units for performing different steps of the method described herein. The computer 60 also comprises an input/output (I/O) unit 66 for receiving the (downsampled) auxiliary information map and the associated texture and for outputting the updated and upsampled auxiliary information map. The I/O unit 66 has been illustrated as a single unit in FIG. 11 but can likewise be in the form of a separate input unit and a separate output unit.

Furthermore, the computer 60 comprises at least one computer program product in the form of a non-volatile memory 62, for instance an EEPROM (Electrically Erasable Programmable Read-Only Memory), a flash memory or a disk drive. The computer program product comprises a computer program 68, which comprises code means which when run on the computer 60, such as by the processing unit 64, causes the computer 60 to perform the steps of the method described in the foregoing in connection with FIG. 8. Hence, in an embodiment the code means in the computer program 68 comprises an upsampling module or upsampler 110 for upsampling the auxiliary information map, a pixel selecting module or pixel selector 120 for selecting the multiple reference pixels and a value calculating module or value calculator 130 for calculating the updated pixel value. These modules 110-130 essentially perform the steps of the flow diagram in FIG. 8 when run on the processing unit 64. Thus, when the different modules 110-130 are run on the processing unit 64 they correspond to the corresponding units 110-130 of FIG. 9.

The computer program 68 may additionally comprise a portion identifying module or portion identifier and/or a filter module or filter unit as disclosed in connection with FIG. 9.

Figure 10:
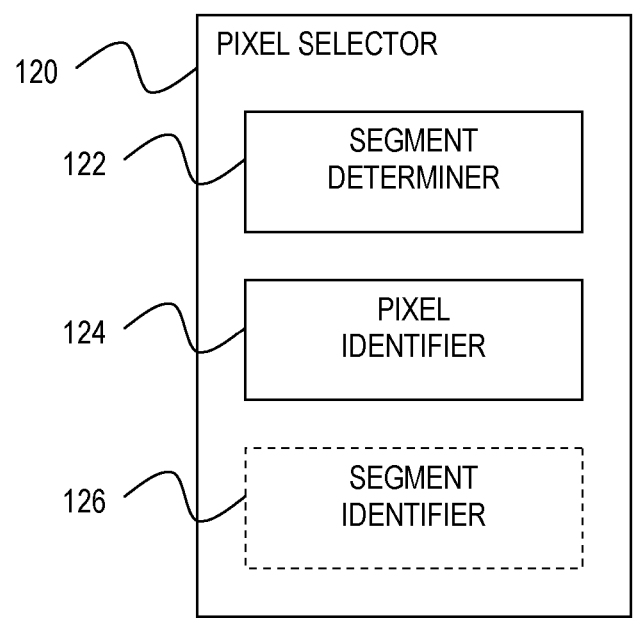
FIG. 10 is a schematic block diagram illustrating the pixel selector of FIG. 9 according to an embodiment.

FIG. 10 is a schematic block diagram of an implementation embodiment of the pixel selector 120 of the device 100 in FIG. 9 or of the pixel selecting module/pixel selector 120 of FIG. 11. A segment determiner 122 of the pixel selector 120 is configured to determine to which segment of multiple segments in the texture the texel position corresponding to the position of the current pixel belongs to. Thus, in this embodiment the texture comprises multiple defined segments as previously disclosed herein. A pixel identifier 124 is configured to identify those reference pixels of a set of reference pixels present within a search space relative to the current pixel in the upsampled auxiliary information map. The reference pixels identified by the pixel identifier 124 have positions within the upsampled auxiliary information map that correspond to positions in the texture belonging to the segment determined by the segment determiner 122.

In a particular embodiment, the pixel identifier 124 is configured to identify the reference pixels within a search space as previously discussed herein, such as a search space of (2W+1)×(2W+1) reference pixels centered in the upsampled auxiliary information map at the position of the current pixel. Other search space sizes and shapes are possible and within the scope of the embodiments.

In an embodiment the device for upsampling the auxiliary information map also comprises an optional segment identifier 126, such as implemented as a part of the pixel selector 120. The segment identifier 126 is configured to process the texture associated with the current auxiliary information map in order to identify and define the multiple segments in the texture. The segment identifier 126 can then operate and use any known segment/region/edge detecting technique that processes the texel values of the texels in the texture in order to identify the multiple segments using, for instance, mean-shift image segmentation, pyramid image segmentation, k-means clustering, edge detection or thresholding.

The units 122-126 of the pixel selector 120 can be implemented in hardware, software or a combination of hardware and software. The units 122-126 may all be implemented in the pixel selector 120. Alternatively, at least one of the units 122-126 could be implemented elsewhere in the device for upsampling the auxiliary information map.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] Y. Boykov and V. Kolmogorov, "An experimental compression of min-cut/Max-flow algorithms for energy minimization in vision.", IEEE Transactions on Pattern Analysis and Machine Intelligence, vol. 26, no. 9, pp. 1124-1137, September 2004.
[2] M. Bleyer and M. Gelautz, "Graph-based surface reconstruction from stereo pairs using image segmentation", in SPIE, vol. 5665, pp. 288-299, January 2005.
[3] P. F. Felzenszwalb and D. P. Huttenlocher: "Efficient belief propagation for early vision", in CVPR, pp. 261-268, 2004.
[4] L. Hong and G. Chen: "Segment-based stereo matching using graph cuts", in CVPR, pp. 74-81, 2004.
[5] C. Zitnick, S. B. Kang, M. Uyttendaele, S. Winder, R. Szeliski: "High-Quality Video View Interpolation Using a Layered Representation", in ACM SIGGRAPH, vol. 23(3), pp. 600-608. August 2004.
[6] D. Ziou and S. Tabbone: "Edge Detection Techniques—An Overview", International Journal of Pattern Recognition and Image Analysis, vol. 8(4), pp. 537-559, 1998.

The invention claimed is:

1. A method of upsampling an auxiliary information map comprising multiple pixels having a respective pixel value and being associated with a texture comprising multiple texels having respective texel values, said method comprising:
 upsampling said auxiliary information map based on said pixel values of said multiple pixels of said auxiliary information map to form an upsampled auxiliary information map comprising multiple pixels;
 for at least one pixel of said multiple pixels of said upsampled auxiliary information map, selecting, for said at least one pixel, multiple reference pixels in said upsampled auxiliary information map based on texel values of a portion of said multiple texels in said texture; and
 calculating an updated pixel value for said at least one pixel based on pixel values of said selected multiple reference pixels.

2. The method of claim 1, further comprising identifying said portion of said multiple texels in said texture based on a position of said at least one pixel in said upsampled auxiliary information map.

3. The method of claim 1, further comprising defining, based on said texel values, multiple segments in said texture, where each segment of said multiple segments comprises at least one texel of said multiple texels, wherein selecting said multiple reference pixels comprises:
 determining to which segment of said multiple segments a texel position in said texture corresponding to a position of said at least one pixel in said upsampled auxiliary information map belongs;
 defining a search space encompassing a set of reference pixels relative to said at least one pixel in said upsampled auxiliary information map; and
 identifying the reference pixels of said set of reference pixels having positions in said upsampled auxiliary information map corresponding to positions in said texture belonging to said determined segment.

4. The method of claim 3, wherein defining said multiple segments comprises defining said multiple segments based on said texel values and employing one of mean-shift image segmentation, pyramid image segmentation, k-means clustering, edge detection and thresholding.

5. The method of claim 3, wherein defining said search space comprises defining a search space of (2W+1)×(2W+1) reference pixels centered in said upsampled auxiliary information map at said position of said at least one pixel in said upsampled auxiliary information map, where W is a positive integer equal to or larger than one but smaller than (N+1)/2, where N denotes the total number of pixels in a row of pixels or a column of pixels in said upsampled auxiliary information map.

6. The method of claim 1, wherein upsampling said auxiliary information map comprises upsampling said auxiliary information map based on said pixel values of said multiple pixels and employing one of nearest neighbor interpolation, bilinear interpolation, bicubic interpolation and splines to form said upsampled auxiliary information map.

7. The method of claim 1, wherein upsampling said auxiliary information map comprises upsampling said auxiliary information map based on said pixel values of said multiple pixels of said auxiliary information map to form said upsampled auxiliary information map having a resolution that is equal to a resolution of said texture.

8. The method of claim 1, wherein calculating said updated pixel value comprises calculating said updated pixel value for said at least one pixel to be one of the median or average of the pixel values of said selected multiple reference pixels.

9. The method of claim 1, wherein said auxiliary information map is a depth map comprising multiple pixels having a respective depth value and wherein:
 upsampling said auxiliary information map comprises upsampling said depth map based on said depth values of said multiple pixels of said depth map to form an upsampled depth map comprising multiple pixels;

selecting said multiple reference pixels comprises selecting, for said at least one pixel, multiple reference pixels in said upsampled depth map based on said texel values of said portion of said multiple texels in said texture; and calculating said updated pixel value comprises calculating an updated depth value for said at least one pixel based on depth values of said selected multiple reference pixels.

10. The method of claim 1, wherein said auxiliary information map is a disparity map comprising multiple pixels having a respective disparity value and wherein:

upsampling said auxiliary information map comprises upsampling said disparity map based on said disparity values of said multiple pixels of said disparity map to form an upsampled disparity map comprising multiple pixels;

selecting said multiple reference pixels comprises selecting, for said at least one pixel, multiple reference pixels in said upsampled disparity map based on said texel values of said portion of said multiple texels in said texture; and calculating said updated pixel value comprises calculating an updated disparity value for said at least one pixel based on disparity values of said selected multiple reference pixels.

11. The method of claim 1, further comprising smoothing said updated pixel value by pixel value filtering.

12. A non-transitory computer-readable medium comprising, stored thereupon, a computer program for upsampling an auxiliary information map comprising multiple pixels having a respective pixel value and being associated with a texture comprising multiple texels having respective texel values, said computer program comprising code that, when run on a computer, causes the computer to:

upsample said auxiliary information map based on said pixel values of said multiple pixels of said auxiliary information map to form an upsampled auxiliary information map comprising multiple pixels;

for at least one pixel of said multiple pixels of said upsampled auxiliary information map, select, for said at least one pixel, multiple reference pixels in said upsampled auxiliary information map based on texel values of a portion of said multiple texels in said texture; and calculate an updated pixel value for said at least one pixel based on pixel values of said selected multiple reference pixels.

13. A device for upsampling an auxiliary information map comprising multiple pixels having a respective pixel value and being associated with a texture comprising multiple texels having respective texel values, said device comprising:

an upsampler configured to upsample said auxiliary information map based on said pixel values of said multiple pixels of said auxiliary information map to form an upsampled auxiliary information map comprising multiple pixels;

a pixel selector configured to select, for at least one pixel of said multiple pixels of said upsampled auxiliary information map, multiple reference pixels in said upsampled auxiliary information map based on texel values of a portion of said multiple texels in said texture; and a value calculator configured to calculate an updated pixel value for said at least one pixel based on pixel values of said multiple reference pixels selected by said pixel selector.

14. The device of claim 13, further comprising a portion identifier configured to identify said portion of said multiple texels in said texture based on a position of said at least one pixel in said upsampled auxiliary information map.

15. The device of claim 13, wherein said texture comprises multiple segments, where each segment of said multiple segments comprises at least one texel of said multiple texels, and wherein said pixel selector comprises:

a segment determiner configured to determine to which segment of said multiple segments a texel position in said texture corresponding to a position of said at least one pixel in said upsampled auxiliary information map belongs to; and a pixel identifier configured to identify reference pixels of a set of reference pixels present within a search space relative said at least one pixel in said upsampled auxiliary information map, wherein said reference pixels identified by said pixel identifier have positions in said upsampled auxiliary information map corresponding to positions in said texture belonging to said segment determined by the segment determiner.

16. The device of claim 15, further comprising a segment identifier configured to identify said multiple segments based on said texel values and employing one of mean-shift image segmentation, pyramid image segmentation, k-means clustering, edge detection and thresholding.

17. The device of claim 15, wherein said pixel identifier is configured to identify said reference pixels of said set of reference pixels present within a search space of (2W+1)× (2W+1) reference pixels centered in said upsampled auxiliary information map at said position of said at least one pixel in said upsampled auxiliary information map, where W is a positive integer equal to or larger than one but smaller than (N+1)/2, where N denotes the total number of pixels in a row of pixels or a column of pixels in said upsampled auxiliary information map.

18. The device of claim 13, wherein said upsampler is configured to upsample said auxiliary information map based on said pixel values of said multiple pixels and employing one of nearest neighbor interpolation, bilinear interpolation, bicubic interpolation and splines to form said upsampled auxiliary information map.

19. The device of claim 13, wherein said upsampler is configured to upsample said auxiliary information map based on said pixel values of said multiple pixels of said auxiliary information map to form said upsampled auxiliary information map having a resolution that is equal to a resolution of said texture.

20. The device of claim 13, wherein said value calculator is configured to calculate said updated pixel value for said at least one pixel to be one of the median or average of the pixel values of said multiple reference pixels selected by said pixel selector.

21. The device of claim 13, wherein:

said auxiliary information map is a depth map comprising multiple pixels having a respective depth value;

said upsampler is configured to upsample said depth map based on said depth values of said multiple pixels of said depth map to form an upsampled depth map comprising multiple pixels;

said pixel selector is configured to select, for said at least one pixel, multiple reference pixels in said upsampled depth map based on said texel values of said portion of said multiple texels in said texture; and said value calculator is configured to calculate an updated depth value for said at least one pixel based on depth values of said multiple reference pixels selected by said pixel selector.

22. The device of claim 13, wherein said auxiliary information map is a disparity map comprising multiple pixels having a respective disparity value and wherein:

said upsampler is configured to upsample said disparity map based on said disparity values of said multiple pixels of said disparity map to form an upsampled disparity map comprising multiple pixels;

said pixel selector is configured to select, for said at least one pixel, multiple reference pixels in said upsampled disparity map based on said texel values of said portion of said multiple texels in said texture; and said value calculator is configured to calculate an updated disparity value for said at least one pixel based on disparity values of said multiple reference pixels selected by said pixel selector.

23. The device of claim 13, further comprising a filter unit configured to smooth said updated pixel value by pixel value filtering.

* * * * *